No. 615,276. Patented Dec. 6, 1898.
A. HURFORD.
MINE TRAP DOOR.
(Application filed Dec. 2, 1897.)
(No Model.) 2 Sheets—Sheet 1.
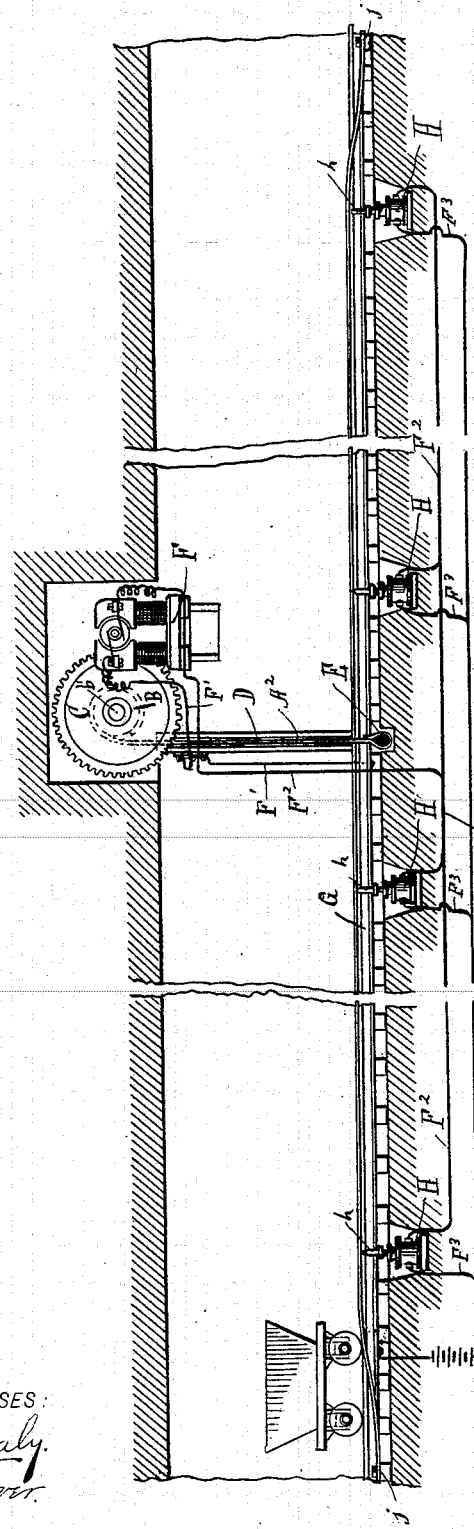
WITNESSES:
Daniel E Daly.
J L Ward Hoover.
INVENTOR
Alvin Hurford
BY
Lynch Dore & Connell
ATTORNEYS.

No. 615,276. Patented Dec. 6, 1898.
A. HURFORD.
MINE TRAP DOOR.
(Application filed Dec. 2, 1897.)
(No Model.) 2 Sheets—Sheet 2.
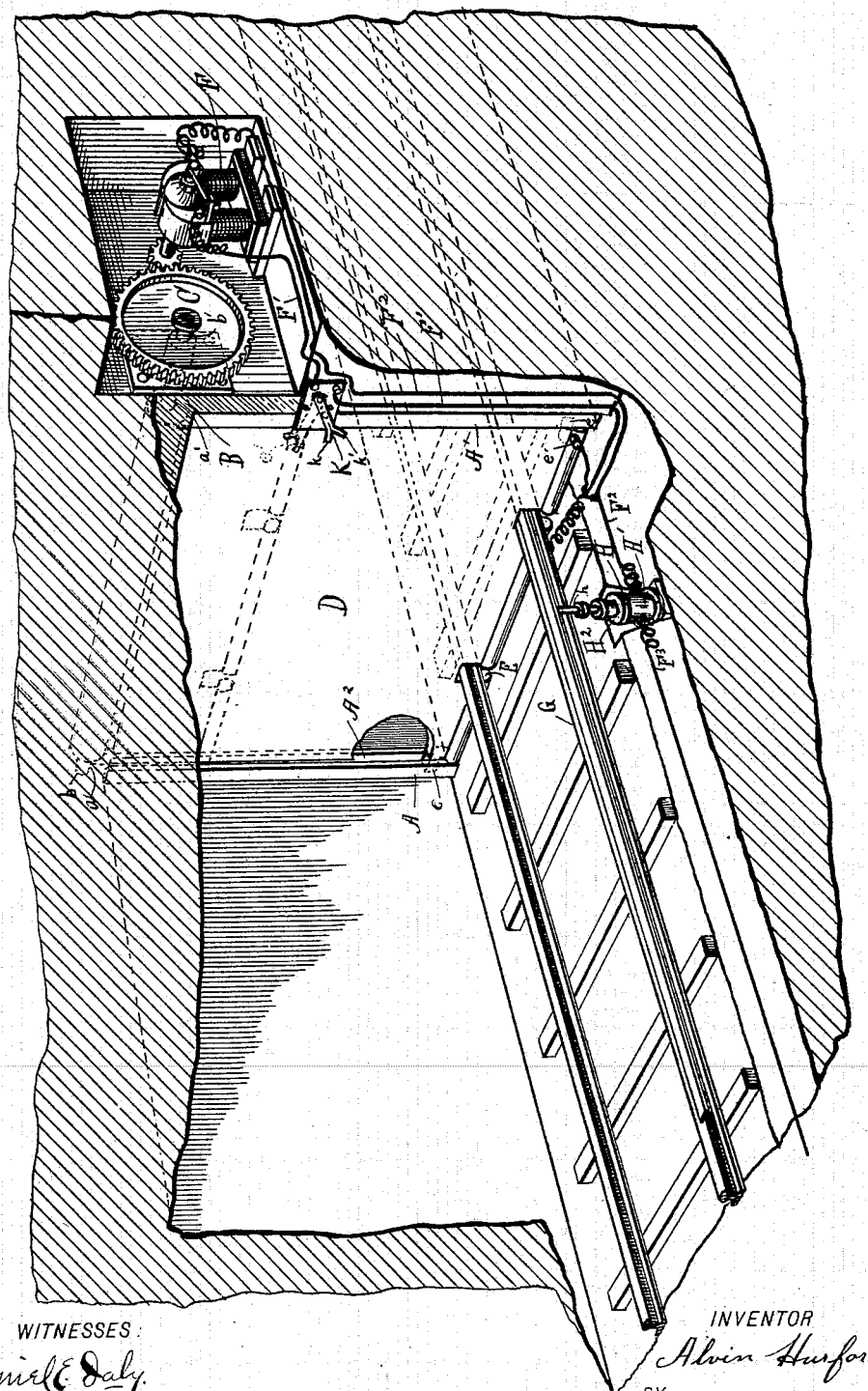
WITNESSES:
INVENTOR
Alvin Hurford
BY
ATTORNEYS.

UNITED STATES PATENT OFFICE.

ALVIN HURFORD, OF CANTON, OHIO.

MINE TRAP-DOOR.

SPECIFICATION forming part of Letters Patent No. 615,276, dated December 6, 1898.

Application filed December 2, 1897. Serial No. 660,566. (No model.)

*To all whom it may concern:*

Be it known that I, ALVIN HURFORD, of Canton, Stark county, Ohio, have invented certain new and useful Improvements in Mine Trap-Doors; and I do hereby declare the following to be a full, clear, and exact description of the invention, such as will enable others skilled in the art to which it pertains to make and use the same.
My invention relates to trap-doors for mines; and it consists in the peculiar construction hereinafter set forth and claimed.

The object of this invention is to provide a trap-door for the passage-ways or airways of mines which is composed of a flexible curtain suitably mounted on a roller, so as to be wound thereon or unwound therefrom by connecting the roller with a suitable electric motor. The electric motor is so connected to the roller as to raise the trap-door quickly and positively, and the circuit of the wires controlling the passage of the current to the electric motor is so arranged and operated by the passage of the coal-cars (one or more) upon approaching and leaving the trap-door that upon the approach of the cars to the trap-door the current is turned onto the electric motor, causing it to operate in such a manner as to raise the trap quickly and keep the trap raised until the passage through the trap of the car or train, and also after the car or train has passed through the trap the current is cut off from the motor automatically, and the curtain or trap closes of itself by means of a single weight properly secured to its lower end.

I have shown and will describe a construction which I prefer to use for operating the trap by means of an electric motor; but I do not wish to limit myself to the details as shown and described.

In the drawings, Figure I is a view in side elevation of a mineway, showing one manner of operating the trap. Fig. II illustrates the same in front elevation. Figs. III, IV, and V represent details of construction.

A A' represent two uprights, which are located in the mine-passage at a part where it is desired to trap the air. These uprights A A' are supported in the passage-way in any suitable manner, so as to keep them rigidly in position. At the points $a$ $a'$ are provided suitable bearings, in which is mounted a roller B, the roller B being provided with journals $b$ $b'$ for engaging the bearings. The journal $b'$ extends out beyond its bearing and has secured to it a gear-wheel C.

D represents a curtain or door which is attached at its upper end to the roller B, so as to be capable of being wound or rolled on said roller. The curtain D is provided at its lower end with a weight E, which may be attached to the curtain in any manner; but I prefer that the said weight be hemmed in the said curtain, as shown in the drawings.

Extending from each side, at the lower end of the curtain D and preferably formed integral with the weight E, are two guide-spuds $e$ $e$. The object of these guide-spuds $e$ $e$ is to guide the curtain or door in its vertical movement up or down and keep the said curtain or door from unduly swinging between the uprights A A'. The spuds $e$ $e$ run in guideways or grooves $A^2$, formed on the inside of uprights A A'.

F represents an electric motor of any suitable construction, adapted by its connection with the roller B to operate said roller so as to wind or roll the curtain up.

$F'$ and $F^2$ represent wires connected to the motor F, one, $F'$, forming the return-wire for the current, and, if preferred, connected to the rail G, which in turn is connected to one pole of the battery or dynamo which supplies the current. This wire may, however, be connected directly to a return-wire instead of being connected to the rail G. The wire $F^2$ leads to suitable make-and-break devices H H H, which may be constructed, as illustrated in Fig. IV, as follows:

$H'$ represents a cylindrical casing or container, preferably formed of metal and provided with a cover $H^2$. Extending through the cover $H^2$ and guided thereby is a pin $h$. This pin $h$ is vertically movable through the cover $H^2$ and rests at its lower end upon a metallic spring-plate $h'$, which is electrically connected to the wire $F^2$, the wire $F^2$ passing from thence outward through the casing $H'$ and being properly insulated from said casing.

$h^2$ represents a metallic spring-plate adapted to form electrical connection with plate $h'$ as the pin $h$ is depressed and to break connection when the pin $h$ is free to rise. The plate $h^2$ is in turn electrically connected to a wire $F^3$, the wire $F^3$ constituting the direct feed-wire or main feed-wire from the source of electric supply, and thus it will be seen that as either of the pins $h$ is depressed an electrical connection is made between the wires $F^2$ and $F^3$, and thus an electrical circuit is established through the motor F, which in turn causes said motor to operate and by its connection with the roller B to raise or open the trap-door D. The breaking of the contact-points $h'$ $h^2$ in all of the make-and-break devices H H and H opens the circuit and cuts off the electric supply to the motor F, which causes the motor to stop and allows the weight E to lower the curtain, which in the construction shown in the drawings would act to reverse the motion of the armature or motor.

In order that the traffic of the car or train of cars may operate to make a proper contact, so as to establish a current through the motor F upon the approach of said car or train toward the trap-door, I prefer to use the following-described construction, illustrated in the drawings: Properly secured alongside of the track G, and preferably at the outside of the same, is a spring-bar J, the ends of which are preferably slotted, as at $j\,j$, and secured to ties K K at its respective ends by means of lag-screws or bolts $k\,k$. The slots $j\,j$ allow the ends of the bar J to slide as it is depressed by the wheels of the car or train. The normal position of the bar J is above the tread of the rail G, as shown in full lines in Fig. I, while its position when depressed by the weight of the car is indicated by the dotted line in Fig. III.

In order to make sure of the curtain or doors being open in time, I have extended the bar J along the track G for quite a distance—say thirty feet or more—at both sides of the trap, and thus it will be seen that the contact or make and break is operated as the car reaches the bar J and the motor F is set in motion, quickly raising the curtain or trap D until the said curtain has reached the top, when said curtain will operate a suitable cut-out switch for automatically cutting off the current to the motor F, preventing said curtain from becoming unduly strained by the motor. The cut-out switch is shown in Fig. II and is operated by a pin $e'$, secured to the lower end of the curtain D. The pin $e'$ on its upward movement strikes an arm $k$ of switch K and opens the switch, thus cutting off the current to the motor, this allowing the curtain to descend a short distance, and the pin $e'$ engages the arm $k'$ of switch K, thus again cutting in the current to motor, and thus the curtain is prevented from lowering, except the short distance between the top and the switch, until the current is cut off at track devices, as hereinbefore set forth. After the car or train has passed through the trap-door and has left the bar J the said bar assumes its normal position, as do also the several pins $h\,h\,h$, cutting off the current to the motor and allowing the trap-door by means of the weight E to lower or close.

While I have shown and described in the drawings and specification a particular construction and apparatus for accomplishing the object in view, still I do not wish to limit myself to the style of motor used, the means of connecting the motor to the roller, nor the means for making and breaking the circuit between the source of supply of electricity and the motor.

What I claim is—

1. An air-trap for mines comprising a roller supported in suitable bearings, a flexible door or curtain mounted on said roller, an electric motor connected to said roller, means operated by a passing car for cutting said motor into circuit to roll up the curtain, and means for cutting out and subsequently cutting in the motor, comprising a switch operated by a contact device carried near the lower end of the curtain.

2. In a mine trap-door, or curtain-operating device, the combination with a roller, of a weighted curtain, an electric motor for operating said roller during the upward movement of the curtain, and a switch device for first cutting out and subsequently cutting in the motor, said switch device being operated by a contact device on the curtain.

3. An air-trap for mines comprising a roller provided at one end with a gear-wheel, a door or curtain mounted on said roller, and adapted to roll up thereon, an electric motor in gear with said gear-wheel, electrical connections for supplying current to said motor, means for cutting the motor into circuit to raise the curtain, and a device carried by the curtain for cutting the motor out of circuit after the curtain is raised to permit the curtain to descend by gravity.

4. In an air-trap for mines, the combination with the flexible door or curtain, of a roller operating said curtain, a motor operating the roller and a cut-out switch located at the upper end of the trap-frame, said switch operated by a projection on the curtain to cut off the current to the motor and permit the curtain to unroll and descend by gravity, substantially as shown and described.

In testimony whereof I sign this specification, in the presence of two witnesses, this 12th day of November, 1897.

ALVIN HURFORD.

Witnesses:
J. L. WARD HOOVER,
ELLA E. TILDEN.